July 6, 1926.
B. C. WHITE
1,591,452
INKING ROLLER
Filed Dec. 2, 1922   2 Sheets-Sheet 2
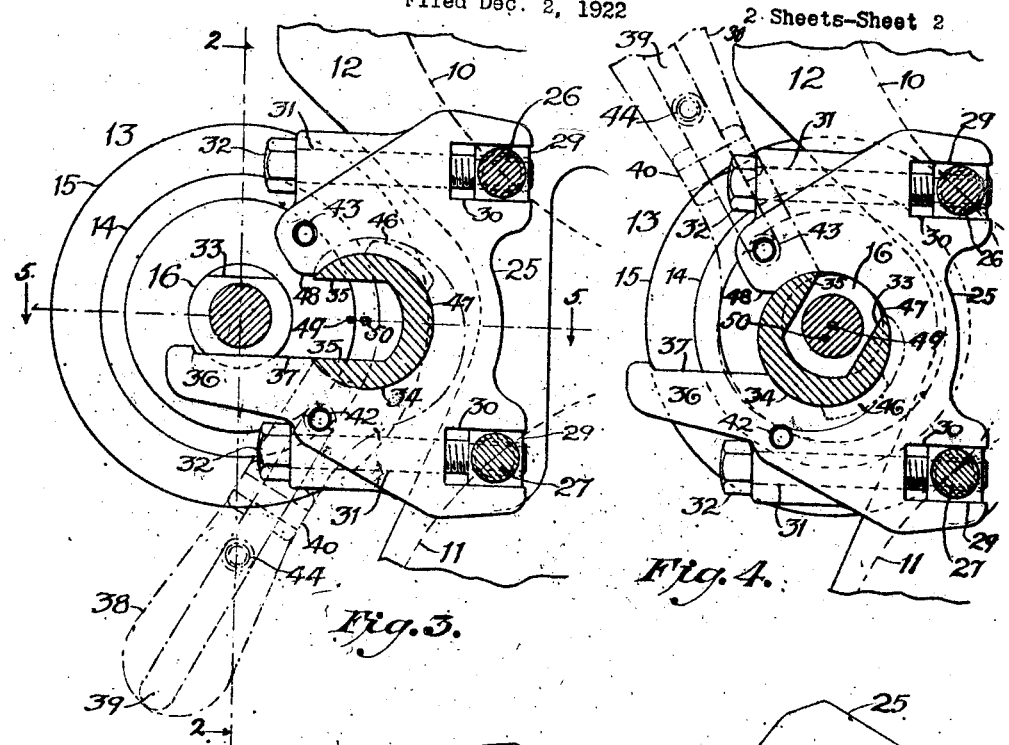
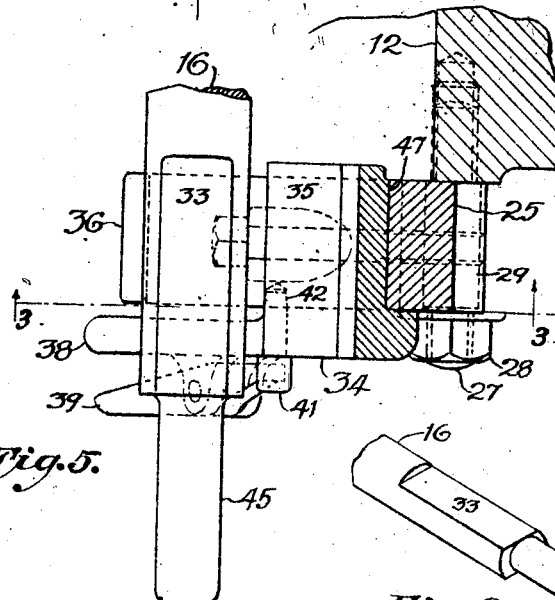
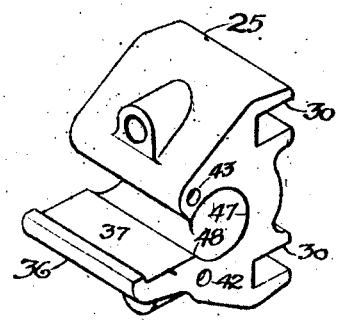
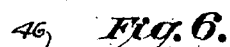
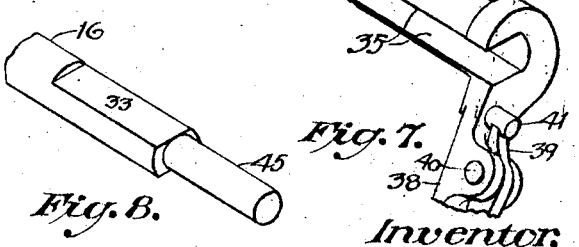
Inventor;
Bruce Clark White
Wm Bodge
Attorney.

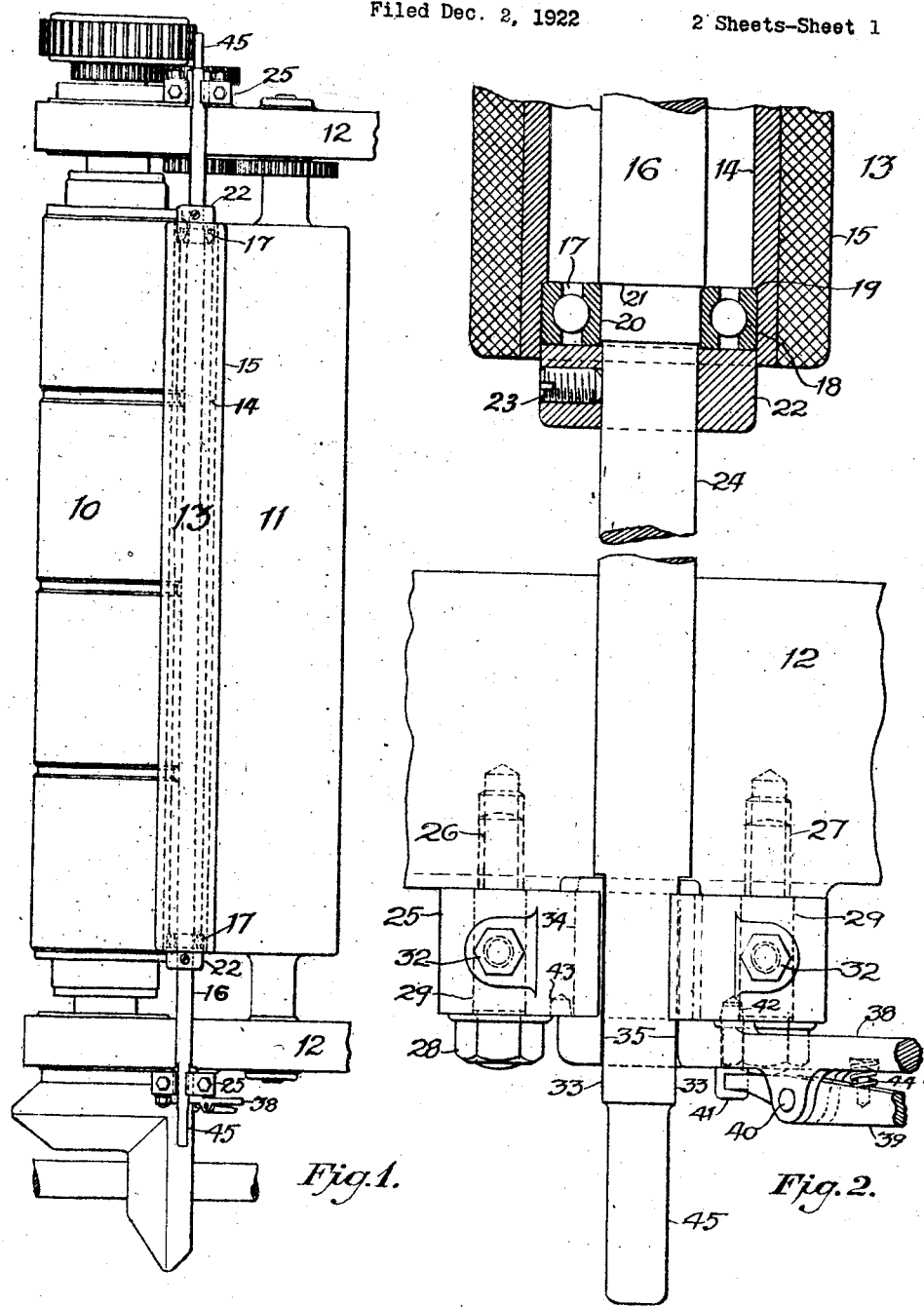

Patented July 6, 1926.

1,591,452

UNITED STATES PATENT OFFICE.

BRUCE C. WHITE, OF NEW YORK, N. Y.; MARIA LOUISA WHITE EXECUTRIX OF SAID BRUCE C. WHITE, DECEASED.

INKING ROLLER.

Application filed December 2, 1922. Serial No. 604,514.

The invention relates to improvements in inking rollers for printing presses for evenly distributing, transferring and applying the ink between a series of cylinders or rollers or to the plate cylinders or forms of the press, and has particular reference to the construction of the rollers and their adjustment with respect to the series of cylinders.

Heretofore the practice has been to make the body of such rollers in the form of a tube, into each end of which is welded a solid shank, reduced at their outer ends to form roller journals adapted to run in adjustable sockets or bearings provided with hinged caps secured by hinge bolts and thumb-nuts, the caps being adapted to detachably hold the roller in the bearings. Such rollers and bearings are objectional in many ways, as the rollers are apt to be out of balance and to run eccentric if the journal ends or shanks become bent or sprung. The bearings are also liable to run hot if not continuously lubricated. To disengage a roller thus mounted from contact with cooperating cylinders it must be removed from the press, two operators being usually employed in disconnecting or setting the same, or one operator must go successively to opposite ends thereof for this purpose. Also under this arrangement difficulty frequently occurs in making the necessary socket or bearing adjustments on account of their inaccessible positions on the machine.

Among the objects of the present invention is to provide means whereby a roller may be introduced into the press and temporarily supported at its opposite ends upon convenient rests and from there transferred to bearings or bushings having means by which to shift the roller into and out of operative inking position relative to adjacent rollers or cylinders, the shifting movements being accomplished by a single operator from one side of the machine.

A further object is to provide means for adjusting the opposite ends of the inking roller independently of each other and in operative relation with a pair of adjacent cylinders in such manner that an adjustment with respect to either one of the latter will unaffect the other.

Another object of my invention is to provide means for throwing the roller out of inking contact with both of said cylinders simultaneously by a single movement of a handle, leaving the roller in position to be removed from the press, or to be again moved into inking contact, and also for means for locking the handle in both positions.

A further object of the invention is to provide means for reducing the running friction of the rollers to a minimum by introducing anti-friction ball or roller bearings into the ends of the rollers, whereby the roller shafts become non-rotative when in operation, with the result that the rollers will run true even though the roller shafts may become slightly bent or sprung. The roller shafts may be made as stiff as desired without increasing the friction, weight or inertia of the running element. My improved construction holds the inking rollers so rigidly that vibration of the rollers is practically eliminated, hence they have no tendency to deflect into the gaps and gullies of the typeform and thereby cause streaks of alternate intensity and faintness in the printing.

While the improvements herein are especially adapted to form rollers of high speed rotary newspaper presses or the like, they are also applicable to other ink transfer rollers in such presses.

For further comprehension of the invention, and of the objects and advantages thereof, reference is had to the following description and accompanying drawings, and to the appended claims in which the various features of the invention are more particularly pointed out.

In the drawings, Fig. 1 is a general view of my improved ink roller as applied to a printing press. Fig. 2 is an enlarged side view of the bearing for supporting the roller, showing one end of the latter in section, taken on line 2—2 of Fig. 3. Fig. 3 is a view taken in vertical section on line 3—3 of Fig. 5 and showing the parts in position to receive or to release the roller or to retain it out of inking contact. Fig. 4 is a view similar to that of Fig. 3, but showing the roller after being moved into operative position. Fig. 5 is a horizontal sectional view on line 5—5 of Fig. 3. Fig. 6 is an isometrical view of a bracket bearing for the support of the roller. Fig. 7 is an isometrical view of one of the bushings provided with an operating handle. And Fig. 8 is an isometrical view of one end of the roller shaft.

Referring to the drawings, numeral 10 indicates a form or plate cylinder; 11, an ink distributing cylinder, and 12, the opposite frames of a printing press in which the rotating elements are mounted.

The inking roller 13 consists preferably of a tube 14, the outer surface of which is covered with the usual composition, or rubber or the like, indicated at 15. A shaft 16 extends longitudinally through the roller and projects at opposite ends to engage supporting members. The roller 13 is mounted to revolve freely upon the shaft by means of the anti-friction bearings 17, preferably of the ball bearing type, arranged in the opposite ends of the tube, and which latter ends are counterbored at 18 to form internal shoulders 19. The shaft 16 is slightly reduced in diameter at each end at 20 to form a shoulder 21, and the ball bearings are snugly fitted into the counterbores 18 and upon the shaft at 20 and against the shoulders 19 and 21. A collar 22 is mounted on the shaft and secured thereto by the set-screw 23, the collar being preferably disposed a short distance within the tube 14 to prevent the entrance of dust. The parts are so fitted and assembled that the roller may be free to rotate upon the shaft but without lateral or longitudinal loss motion thereof, the shaft being preferably further reduced in diameter at 24 to facilitate assembling. The shaft is also provided at its opposite ends with handles 45, and with oppositely flattened faces 33.

The roller shaft 16 is supported at its opposite ends by the brackets 25, secured to the opposite press-frames 12 by the upper and lower stud-bolts 26 and 27, the bolts being similar and each provided with a squared portion 29 fitting freely in correspondingly squared recesses 30 in the brackets. Screws 31 are freely fitted in the brackets and are provided with heads 32, the inner ends of the screws being threaded through the squared portion of the stud-bolts 26 and 27, whereby the brackets 25 may be adjusted with respect to the cylinders 10 and 11.

The stud-bolt 26 is preferably located at a point on the press-frame coinciding with an extension of a line representing the contact point between the roller 13 and the cylinder 10, and the stud-bolt 27 is correspondingly located with respect to the roller 13 and the cylinder 11, as indicated in Fig. 4; and by adjusting the screws 31 in the respective stud-bolts the opposite ends of the roller 13 may be adjusted independently of each other and with respect to either of the cylinders 10 and 11 to obtain the desired operative pressure therebetween. With the stud-bolts as thus positioned, it will be evident that in the adjustment of the roller with respect to either one of the cylinders, the stud-bolt of the opposite cylinder will act as a pivotal center for such movement, and the existing adjustment relative to said opposite cylinder be unaffected thereby. It is also to be understood that these contacts or operative engagements are made only occasionally and through an extremely small distance at a time in order to provide for the wear and shrinkage of the composition roller 13, and when the adjustments have been made the nuts 28 are tightened to retain the brackets 25 in their adjusted position.

The opposite brackets 25 are bored at 47 to form bearings for the rotative support of the bushings 34, which latter are provided with transverse slots or openings 35 extending from the periphery toward and beyond the center thereof and adapted to aline with each other as positioned in the opposite brackets for the engagement by the oppositely flattened faces 33 at the ends of shaft 16, the latter, in the rotative movement of the bushings, being arranged to be locked therein and held against displacement, as shown in Fig. 4.

The opposite brackets 25 are further provided at 48 with slots or gaps substantially corresponding in width with the openings 35 of the bushings, the brackets also being provided with extensions or roller rests 36, having upper horizontal surfaces 37 arranged to aline with each other and with the bottom wall of the openings 35 in the bushings 34 when the latter are in open position, as indicated in Fig. 3, and in which position the roller-shaft 16 may readily be introduced or withdrawn from the bushings, or held temporarily upon the rests 36. One of the bushings, at the operating side of the machine, is provided with an actuating handle 38, shown in dotted lines in Figs. 3 and 4, in respectively open and closed positions, the actuating handle being provided with a latch-lever 39, pivotally mounted thereon at 40 and provided with a latch-pin 41 arranged to engage latch-holes 42 and 43 in the bracket 25. A spring 44 is disposed between the pivotally connected handle and lever to normally urge the latch-pin into the latch-holes, the latter being suitably positioned to hold the bushing in its extreme of opposite movements, the release thereof being effected by a pressure upon the free end of the latch lever in opposition to the action of the spring.

At the junction of the bushing 34 and handle 38 is formed a hub or flange constituting a shoulder adapted to engage the outer bearing or face of the bracket 25, and at the opposite or inner end of the bushing or corresponding projection or shoulder 46 is formed, the said opposite shoulders being adapted to hold the handle-bushing against endwise movement within the bracket bearing, its lateral position therein being maintained by the relatively small gap space at 48 as compared with the diameter of the bushing. To provide for the endwise connection and disconnection between the bracket and bushing, the peripheral length of the shoulder 46 of the latter is made somewhat less than the gap space at 48, and by effecting their respective registration the bushing may be readily inserted or withdrawn, it being understood that the bushing in the opposite bracket bearing is provided with similar projecting shoulders at its opposite ends. In the position shown in Fig. 4, it will be obvious that by turning the handle bushing as thus engaged with the flattened surfaces 33 of the shaft 16, the latter will be correspondingly rotated and in turn will likewise rotate the bushing in the opposite bracket. As indicated in the figure the center 49 of the shaft is disposed eccentrically in the bushing with respect to the rotative center 50 thereof, and in the normal movement of the latter, respectively shown in opposite extremes in Figs. 3 and 4, the roller 13 mounted on said shaft is adapted to be moved from an inoperative into an operative position with respect to the cylinders 10 and 11, the stiffness of the shaft 16 being sufficient to equally operate the opposite ends of the roller without spring or vibration.

The inking roller as thus arranged is adapted to operate in connection with a single roller or cylinder, or with a pair of cylinders, as shown, and a single operator stationed at one side of the machine may quickly shift the roller by means of the handle 38 either into or out of operative position with little or no loss of time, a matter of considerable advantage in the larger type of machines where numerous rollers are employed and frequent short stoppages required for inspection of the printed work.

It will be observed that the actuating handle and the adjusting screws are all arranged on the outside of the frames and away from the train of gearing which is generally placed between the form cylinder 10 and the ink distributing cylinder 11, as shown in Fig. 1.

While I have shown and described the preferred construction and arrangement of the several devices and the manner in which they co-operate to accomplish the desired result, it is to be understood that various detail changes may be made in the several parts without departing from the essential principle and scope of the invention.

What I claim as my invention and desire to secure by Letters Patent, is:

1. In a printing press, an inking device including an inking roller, and means actuated from one end thereof for moving the same into operative position, said means including a shaft loosely supporting said roller, and rotatively mounted bushings eccentrically supporting said shaft, the latter being adapted to be rotated by a bushing at one end of the shaft and to rotate in turn the bushing at its oppoiste end.

2. In a printing press, an inking device including an inking roller arranged to be moved into and out of operative position, and means actuated from one end of said roller for effecting said movements, said means including a shaft loosely supporting said roller, and rotatively mounted bushings eccentrically supporting said shaft, the latter being adapted to be rotated by a bushing at one end of the shaft and to rotate in turn the bushing at its opposite end.

3. In a printing press, an inking device including an inking roller, means for adjusting said roller with respect to an operative inking position, and means actuated from one end of said roller for moving the same out of and into such operative position, independently of said adjusting means, said moving means including a shaft loosely supporting said roller, and rotatively mounted bushings eccentrically supporting said shaft, the latter being adapted to be rotated by a bushing at one end of the shaft and to rotate in turn the bushing at its opposite end.

4. In a printing press, an inking device including an inking roller, means for adjusting said roller with respect to a plurality of operative inking positions, and means actuated from one end of said roller for moving same into and out of such positions independently of said adjusting means, said moving means including a shaft loosely supporting said roller, and rotatively mounted bushings eccentrically supporting said shaft, the latter being adapted to be rotated by a bushing at one end of the shaft and to rotate in turn the bushing at its opposite end.

5. In a printing press, an inking device including an inking roller, means actuated from one end of said roller for moving the same into and out of operative position, means for locking said roller in said positions, including a shaft loosely supporting said roller, and rotatively mounted bushings eccentrically supporting said shaft, the latter being adapted to be rotated by a bushing at one end of the shaft and to rotate in turn the bushing at its opposite end.

6. In a printing press, an inking device including an inking roller, means actuated from one end of said roller for moving the same into and out of operative position, means for locking said roller at one end thereof in such positions, including a shaft loosely supporting said roller, and rotatively mounted bushings eccentrically supporting said shaft, the latter being adapted to be rotated by a bushing at one end of the shaft and to rotate in turn the bushing at its opposite end.

7. In a printing press, an inking roller, a shaft upon which said roller is free to rotate, bushings detachably coupled to the opposite ends of said shaft for joint rotation therewith, brackets disposed to rotatively receive said bushings, means for shifting said brackets for independent operative adjustment of the opposite ends of said roller, and means independent of said shifting means for rotating one of said bushings to move said roller into and out of operative position.

8. In a printing press, an inking device including an inking roller, means actuated from one end of said roller for moving the latter into and out of operative position, and means for adjusting the opposite ends of said roller independently of each other, said adjusting means including brackets mounted on pivot pins alined substantially with the operative contact line of said roller.

9. In a printing press, an inking roller, a shaft upon which said roller is free to rotate, supports detachably coupled to the opposite ends of said shaft for joint rotation therewith, means for shifting said supports to effect the operative adjustment of said roller, and means independent of said shifting means for rotating one of said supports to move said roller into and out of operative positions.

10. In a printing press, an inking roller, a shaft upon which said roller is free to rotate, bushings detachably coupled to the opposite ends of said shaft for joint rotation therewith, brackets disposed to rotatively receive said bushings, means for shifting said brackets for independent operative adjustment of the opposite ends of said roller, and means independent of said shifting means for rotating one of said bushings to move said roller into and out of operative position.

11. In a printing press, an inking device comprising a relatively fixed shaft, an inking roller rotatable on said shaft, rotatable bushes engaging the opposite ends of said shaft in relative fixed relation therewith, the axis of said shaft being eccentrically disposed with respect to the axis of rotation of said bushes, and an operating handle for one of said bushes.

12. In a printing press, the combination with a movable surface to be inked, of an inking roller therefor, and means actuated from one end of the latter for moving the same into and out of operative position, said means including a shaft loosely supporting said roller, and rotatively mounted bushings eccentrically supporting said shaft, the latter being adapted to be rotated by a bushing at one end of the shaft and to rotate in turn the bushing at its opposite end.

13. In a printing press, the combination with a pair of spaced inking cylinders, of an inking roller, means for adjusting said roller for jointly engaging said pair of cylinders, and means actuated from one end of the said roller for moving the same into and out of engagement with said cylinders, said moving means including a shaft loosely supporting said roller and rotatively mounted bushings eccentrically supporting said shaft, the latter being adapted to be rotated by a bushing at one end of the shaft and to rotate in turn the bushing at its opposite end.

14. In a printing press, the combination with a pair of spaced inking cylinders, of an inking roller, means for independently adjusting the opposite ends of said roller for jointly engaging said pair of cylinders, and means actuated from one end of said roller for moving the same into and out of engagement with said cylinders, said moving means including a shaft loosely supporting said roller and rotatively mounted bushings eccentrically supporting said shaft, the latter being adapted to be rotated by a bushing at one end of the shaft and to rotate in turn the bushing at its opposite end.

15. In a printing press, the combination with a pair of spaced inking cylinders, of an inking roller, a relatively fixed shaft rotatably supporting said roller, means for independently adjusting the opposite ends of said shaft for the joint engagement of said roller with said pair of cylinders, and means actuated through said shaft for moving said roller into and out of engagement with said cylinders, said moving means including rotatively mounted bushings eccentrically supporting said shaft, the latter being adapted to be rotated by a bushing at one end of the shaft and to rotate in turn the bushing at its opposite end.

16. The combination of a tubular inking roller mounted to rotate upon a shaft extending longitudinally therethrough and projecting beyond the ends thereof and means for adjusting both ends of said shaft equally and simultaneously, said means including rotatively mounted bushings eccentrically supporting said shaft, the latter being adapted to be rotated by a bushing at one end of the shaft and to rotate in turn the bushing at its opposite end.

17. In combination with the opposite frames of a printing press, of a pair of brackets mounted for independent adjustment on said frames, bushings rotatable in said brackets and having slots in opposite alinement with each other, a shaft mounted in the slots of said bushings and provided with flattened faces slidable therein for driving engagement therewith, the axis of said shaft being disposed eccentric to the rotative axis of said bushings, an inking roller rotatively mounted on said shaft, and means actuated from one of said bushings for moving said roller into and out of operative position.

18. In a printing press, an inking roller, a shaft upon which said roller is free to rotate, rotatively mounted supports detachably coupled to the opposite ends of said shaft for joint rotation therewith, the axis of rotation of said supports being eccentric to the axis of said shaft, and means for rotating one of said supports to move said roller into and out of operative position.

19. In a printing press, a tubular inking roller, a shaft extending loosely through said roller for the rotative support thereof, bushings coupled to the opposite ends of said shaft for joint rotation therewith, brackets rotatively supporting said bushings, means for detachably connecting said respective brackets and bushings together, and means for detachably connecting said bushings to the ends of said shaft.

20. In a printing press, an inking roller, a shaft upon which said roller is free to rotate, bushings coupled eccentrically to the opposite ends of said shaft for joint rotation therewith, brackets disposed to rotatively support said bushings, pivot studs fixed substantially in alinement with the inking contact lines of said roller and adapted to support said brackets, and means for adjusting said brackets with respect to said studs.

21. In a printing press having opposite side frames, a pair of cylinders rotatively carried thereby, an inking roller provided with a supporting shaft and adapted to contact said pair of cylinders, brackets carried by said frames and supporting said roller at opposite ends of the shaft thereof, pivot studs secured to the opposite frames of the press and positioned thereon at points corresponding substantially with extensions of the contact lines between the said cylinders and the inking roller, and means for adjustably securing said brackets to said pivot studs.

22. The combination of a tubular inking roller mounted to rotate upon a shaft extending longitudinally therethrough and means for laterally adjusting both ends of said shaft comprising eccentric bushings upon said shaft adapted to partake of the rotary movement of said shaft, bearings for said eccentric bushings and means for turning said shaft through a portion of a revolution to effect said adjustment.

23. The combination of a tubular inking roller mounted to rotate upon a shaft extending longitudinally therethrough, flat surfaces upon said shaft adapted to engage a flat sided longitudinal recess in a bushing at each end of said shaft in a manner to cause both bushings to rotate with the shaft; journal bearings for said bushings and means for adjusting the angular position of said shaft.

24. The combination of a tubular inking roller mounted to rotate upon a shaft extending longitudinally therethrough, flat surfaces upon said shaft, bushings longitudinally grooved to admit the flattened portions of said shaft, means for adjusting the angular position of said shaft and bushings and for locking them in different positions and bearings for said bushings.

25. The combination of a tubular inking roller mounted to rotate upon a shaft extending longitudinally therethrough, locking surfaces upon said shaft to engage corresponding locking surfaces in longitudinally grooved bushings; journal bearings for said bushings; an opening through the side wall of each of said journal bearings to admit the said shaft into the grooves of said bushings when the journal bearing openings and the bushing grooves coincide in angular position, and means for turning said shaft and bushings to lock said shaft in said bushings.

26. The combination of a tubular inking roller mounted to rotate upon a shaft extending longitudinally therethrough, eccentric bushings longitudinally recessed to admit the flat-sided portions of said shaft to engage said bushings to rotate them simultaneously by means of said shaft, the eccentricity of said bushings being such as to throw the said roller into contact or out of contact as the eccentric bushings are rotated in one direction or the other.

27. In a printing press having opposite side frames, brackets adjustable in said frames and provided respectively with journal bearings alined with each other, bushings rotatable in the bearings of said brackets, the said brackets and respective bushings having slots extending through adjacent walls thereof, the said slots being of less width than the diameter of the journal bearings of said brackets and adapted to register with each other in one position of rotation of said bushings, a shaft provided at its opposite ends with flattened faces adapted for detachable engagement with the slots of said bushings, the axis of said shaft being eccentric to the axis of rotation of said bushings, an inking roller loosely mounted for rotation on said shaft, and means for rotating one of the said bushings.

28. The combination in a printing press of an inking roller contacting with two cylinders of said press for ink transfer, of a shaft supported in end brackets, said end brackets being each supported by two stud bolts in the machine frame, one of said stud bolts of each bracket being located in line with the contact of the roller with one cylinder and the other of said stud bolts being located in line with the contact of the roller with the other cylinder and means for adjusting the brackets upon the stud bolts.

Signed at New York, in the county of New York and State of New York, this 29 day of November A. D. 1922.

BRUCE C. WHITE.